United States Patent
Karikari et al.

(10) Patent No.: US 9,175,186 B2
(45) Date of Patent: Nov. 3, 2015

(54) COATING COMPOSITIONS HAVING CHELANT FUNCTIONALITY

(71) Applicant: Rohm and Haas Company, Philadelphia, PA (US)

(72) Inventors: Afua S. Karikari, Bristol, PA (US); Monica A. Luckenbach, Woxall, PA (US); Ozzie M. Pressley, Cheltenham, PA (US); Theodore Tysak, Ambler, PA (US)

(73) Assignee: Rohm and Haas Company

( * ) Notice: Subject to any disclaimer, the term of this patent is extended or adjusted under 35 U.S.C. 154(b) by 0 days.

(21) Appl. No.: 14/380,960

(22) PCT Filed: Feb. 22, 2013

(86) PCT No.: PCT/US2013/027385
§ 371 (c)(1),
(2) Date: Aug. 26, 2014

(87) PCT Pub. No.: WO2013/133994
PCT Pub. Date: Sep. 12, 2013

(65) Prior Publication Data
US 2015/0051336 A1 Feb. 19, 2015

Related U.S. Application Data

(60) Provisional application No. 61/607,794, filed on Mar. 7, 2012.

(51) Int. Cl.
*C09D 133/08* (2006.01)
*C09D 5/00* (2006.01)
*C09D 5/02* (2006.01)

(52) U.S. Cl.
CPC ............. *C09D 133/08* (2013.01); *C09D 5/00* (2013.01); *C09D 5/02* (2013.01)

(58) Field of Classification Search
CPC ........... C09D 133/08; C09D 5/00; C09D 5/02

USPC ........................................................ 524/547
See application file for complete search history.

(56) References Cited

U.S. PATENT DOCUMENTS

| | | | |
|---|---|---|---|
| 3,331,773 A | 7/1967 | Gunderson et al. | |
| 5,385,960 A | 1/1995 | Emmons et al. | |
| 5,426,142 A | 6/1995 | Rosano et al. | |
| 7,179,531 B2 | 2/2007 | Brown et al. | |
| 7,829,631 B2 | 11/2010 | Wu et al. | |
| 8,106,149 B2 * | 1/2012 | Yoneda | 528/332 |
| 2008/0262192 A1 * | 10/2008 | Yoneda | 528/332 |
| 2013/0109823 A1 | 5/2013 | Backer et al. | |

FOREIGN PATENT DOCUMENTS

| | | | |
|---|---|---|---|
| JP | 2007248863 A * | 9/2007 | |
| WO | WO 2004026918 A1 * | 4/2004 | |
| WO | 2013/066931 A1 | 5/2013 | |
| WO | 2013/066934 A1 | 5/2013 | |

* cited by examiner

Primary Examiner — Michael M Bernshteyn

(57) ABSTRACT

The present invention provides an aqueous opaque coating formulation comprising (A) and aqueous solvent; (B) an inorganic material; and (C) a chelating polymer which comprises units derived from one or more aminocarboxylate compounds or their salts, one or more other polymerizable monomers, one or more ethylenically unsaturated monomers and, optionally, one or more crosslinking monomers. For example, the aminocarboxylate compounds or their salts may be one or more of iminodiacetic acid (IDA), iminosuccinic acid (IDS), ethylenediamine triacetic acid (ED3A) and ethylenediamine disuccinic acid (EDDS), or their salts. Suitable polymerizable monomers may be one or more of glycidyl methacrylate (GMA), allyl glycidyl ether (AGE), vinylbenzyl chloride (VBC), allyl bromide, and their derivatives. The inorganic material may be a pigment, such as titanium dioxide ($TiO_2$) or cadmium sulfide (CdS), or an extender or filler, such as talc ($Mg_3Si_4O_{10}(OH)_2$), calcium carbonate ($CaCO_3$) or mica, or even combinations thereof.

11 Claims, No Drawings

COATING COMPOSITIONS HAVING CHELANT FUNCTIONALITY

CROSS REFERENCE TO RELATED APPLICATIONS

This application is a 35 USC §371 national phase filing of PCT/US2013/027385 filed Feb. 22, 2013, which claims the benefit of U.S. Application No. 61/607,794, filed Mar. 7, 2012.

FIELD OF THE INVENTION

The present invention relates to aqueous opaque coating formulations having good tint strength, viscosity and freeze/thaw stability. These formulations comprise an aqueous solvent; an inorganic pigment; and a chelating polymer which comprises units derived from one or more aminocarboxylate compounds or their salts, and one or more other monomers.

BACKGROUND OF THE INVENTION

It is often desirable to modify or enhance the appearance of various types of substrates by obscuring the surface of such substrates, such as wood, plastic, metal, ceramic, gypsum board (i.e., drywall or sheetrock), paper, fiber, and other, which are used for many purposes, such as flooring, interior and exterior walls, ceilings, roofs, architectural trims, motor vehicle bodies, containers, casings, piping, etc. The ability of opaque aqueous coating formulations, such as paints, primers, mastic sealants, and other opaque coatings, to obscure the color, appearance or pattern of the surface of a substrate, to which it is applied to form an opaque dried film, is sometimes referred to as hiding power or tint strength. Various inorganic materials comprising metal cations are used to impart various characteristics to the dried films resulting from application of aqueous opaque coating formulations. For example, pigments are added to provide opaqueness, tint strength, and even colors, to the formulations and dried films. Extenders (also known as fillers), on the other hand, are generally used to adjust the hardness, rheological properties and other characteristics of the dried films formed from the aqueous opaque coating formulations. In most such formulations, the tint strength of the dried film resulting from application of such formulations is strongly dependent on the type and quality of inorganic material used. Different types of inorganic pigments impart different colors for the dried film. Examples of inorganic pigments include titanium dioxide ($TiO_2$, white), zinc oxide (ZnO, white), cobalt(II) stannate ($Co_2SnO_4$, blue), cadmium selenide (CdSe, red), cadmium sulfide (CdS, yellow), calcium copper silicate ($CaCuSi_4O_{10}$, blue), and hydrated chromium(III) oxide ($Cr_2O_3$, green). Extenders (fillers) that may typically be used in opaque coating formulations include, for example, talc ($Mg_3Si_4O_{10}(OH)_2$), calcium carbonate ($CaCO_3$), nepheline syenite (characterized as having a high ratio of $(Na_2O+K_2O)/SiO_2+(Na_2O+K_2O)/Al_2O_3$), barium sulfate ($BaSO_4$), hydrous kaolin ($Al_2Si_2O_5(OH)_4$), mullite ($Al_2SiO_5$), pyrophyllite ($Al_2Si_4O_{10}(OH)_2$), kyanite ($Al_2OSiO_4$), sillimanite ($Al_2SiO_5$), attapulgite (($Mg$, $Al)_5Si_8O_{20}\cdot 4H_2O$), and mica, among many others. Use of the aforesaid inorganic materials in coating formulations results in the presence of one or more metal cations in the coating formulation, including, without limitation, $Ca^{2+}$, $Mg^{2+}$, $Ba^{2+}$, $Sr^{2+}$, $V^{2+}$, $Mn^{2+}$, $Fe^{2+}$, $Al^{3+}$, $Zr^{2+}$, $Co^{2+}$, $Cd^{2+}$, $Zn^{2+}$, $TiO^{2+}$, $Pb^{2+}$, $Y^{3+}$, $Pd^{2+}$, $Ni^{2+}$, $VO^{2+}$, $Cu^{2+}$, $Ga^{3+}$, $Ti^{3+}$, $Hg^{2+}$, $Sc^{3+}$, $Th^{4+}$, $In^{3+}$, $Fe^{3+}$, $V^{3+}$ and combinations thereof.

Presently, for example, $TiO_2$ is the predominant white inorganic pigment used in the paint industry due to its high refractive index and superior light scattering capabilities, which imparts whiteness, brightness, opacity, light scattering and light stability. $TiO_2$ is often among the most expensive ingredients in a paint formulation and, therefore, there is significant interest in a technology that improves the effective utilization of $TiO_2$ in aqueous coating compositions by reducing the required level of $TiO_2$ while maintaining or improving opacity and other paint properties. One known way of accomplishing this is by employing $TiO_2$ particles having an optimal average particle size and particle size distribution for scattering light. See, for example, U.S. Pat. No. 5,385,960, in which the optimal particle size and spacing are stated as 200 to 250 nanometers, and a few particle diameters, respectively.

Furthermore, it is well understood that when the constituent particles of the inorganic materials are agglomerated or aggregated, they provide less opacity and tint strength than when fully dispersed. Thus, another known way of improving the tint strength performance of paint containing inorganic materials is by dispersing the particles as well as possible in the paint formulation. One way of accomplishing this for $TiO_2$ particles, for example, is to improve the mechanisms for latex polymer adsorption onto the surface of $TiO_2$ particles, thereby forming composite particles. In this area, the development of a wide variety of functional latexes for promoting the formation of latex polymer-pigment composite particles with improved hiding efficiencies has been reported. Aqueous compositions containing carboxylic acids functional groups are, in general, ineffective at promoting adsorption of latex particles onto the surfaces of inorganic particles, and have been associated with poor paint properties including poor water resistance properties, reduced scrub resistance and undesirable viscosity drift.

Another route has been to use polymeric latex particles having at least one phosphate containing compound, to promote adsorption of the polymeric latex particles onto the $TiO_2$ particles, as described in U.S Pat. No. 5,385,960 which discloses aqueous dispersions of such composite particles. U.S. Pat. No. 7,179,531 also discloses aqueous dispersions of composite particles containing $TiO_2$, but here multistage polymer particles also containing dihydrogen phosphate functional groups are adsorbed to the $TiO_2$ particles.

Although latexes containing phosphate functional groups have provided paints with improved hiding performance, this approach is associated with polymerization process complexities in addition, some phosphate-containing latex polymers are known to exhibit undesirable increase in viscosity due to aggregation as a result of the "bridging" of two $TiO_2$ particles by a single polymeric latex particle.

More recently, it has been recognized that acrylic polymers having chelating functionality are useful for binding metal ions in various applications. For instance, U.S. Pat. No. 3,331,773 teaches preparation of water soluble polymers having chelating functionality which are useful as water treatment agents for inhibiting calcium and magnesium scale formation. These polymers are formed by grafting water soluble chelating monomers onto water soluble polymers having aliphatic polymeric backbones. Diethylenetriamine, ethylenediamine tetraacetic acid (EDTA), and other polyalkylene polyamine polyacetic acids are identified in U.S. Pat. No. 3,331,773 as examples suitable chelating monomers.

U.S. Pat. No. 5,426,142 teaches film-forming polymers which contain acetoacetate functionality and are further reacted with amino functional silane to produce selfcrosslinking, ambient curing, film-forming polymers suitable for various uses including coatings and sealants for wood, glass and concrete.

U.S Patent Application No. 2008/0262192 describes water-soluble polymers having a high chelating performance and clay dispersancy that are suitable for use as detergents, water treatment agents and dispersants. These polymers are made by polymerizing an amino group-containing allyl monomer derived from adding an amine compound, such as iminodiacetic acid (IDA), to an allyl monomer, such as allyl glycidyl ether (AGE), with other polymerizable monomers including, without limitation, unsaturated monocarboxylic acid monomers.

Most recently, vinyl aminocarboxylate monomers have been found useful for providing amine-based chelating functionality. Vinyl aminocarboxylate monomers are an entire class of polymerizable acrylic monomers having amine-based chelating functionality and which are polymerizable along with ethylenically unsaturated monomers typically used to produce various types of acrylic monomers. This is related to the technology described in the aforementioned U.S Patent Application No. 2008/00262192 where an AGE-IDA vinyl aminocarboxylate monomer is described and incorporated into carboxylic acid-based copolymers. Polymers comprising polymerized units derived from such vinyl aminocarboxylate monomers have been identified as effective chelating agents and, therefore, are expected to be useful in various possible applications. U.S. Patent Application Publication No. 2013/0109823 (U.S. Ser. Nos. 61/553626, 61/553,642, 61/553,658) describe other vinyl aminocarboxylate monomers, including vinyl aminocarboxylate monomers produced from reactions between (IDA), iminodisuccinic acid (IDS), or salts thereof, and a vinyl epoxy benzene monomer, or between ethylenediamine triacetic acid (ED3A) or its salt, and polymerizable vinyl monomer such as vinyl epoxy benzene, allylglicidyl ether, or glycidyl(meth)acrylate, for example. Also disclosed are polymers having chelating functionality which comprise polymerized units derived from aminocarboxylate monomers produced from reactions between ethylenediamine disuccinic acid (EDDS), or its salt, and a polymerizable vinyl monomer such as vinyl epoxy benzene, allylglicidyl ether, or glycidyl(meth)acrylate. Thus, there has been a continuing need to improve the effective utilization of inorganic materials, such as titanium dioxide, in aqueous coating compositions and thereby to improve the opacity and other performance properties of coating compositions.

The present invention addresses the desire to maximize hiding efficiency of paint formulations containing inorganic materials, by providing aqueous dispersions of composite particles containing inorganic particles and polymeric latex particles, wherein the polymeric latex particles contain aminocarboxylic functional groups to promote adsorption of the polymeric latex particles on the surfaces of pigment surfaces. Specifically, the presence of the aminocarboxylic functional groups provides the latex with "chelant-like" capabilities, hence providing improved binding to inorganic materials in opaque coating formulations.

SUMMARY OF THE INVENTION

The present invention provides an aqueous opaque coating formulation comprising: (A) an aqueous solvent; (B) an inorganic material; and (C) a chelating polymer. The chelating polymer (C) comprises polymerized units derived from: (1) one or more aminocarboxylic acid compounds or their salts; (2) one or more polymerizable monomers comprising a vinyl group, an allyl group, or both, and optionally, an epoxy group; and (3) one or more ethylenically unsaturated monomers.

The inorganic material may be one or more materials selected from the group consisting of titanium dioxide ($TiO_2$), cobalt(II) stannate ($Co_2SnO_4$), cadmium selenide (CdSe), cadmium sulfide (CdS), calcium copper silicate ($CaCuSi_4O_{10}$), and hydrated chromium(III) oxide ($Cr_2O_3$), talc ($Mg_3Si_4O_{10}(OH)_2$), calcium carbonate ($CaCO_3$), nepheline syenite (characterized as having a high ratio of ($Na_2O+K_2O)/SiO_2+(Na_2O+K_2O)/Al_2O_3$), barium sulfate ($BaSO_4$), hydrous kaolin ($Al_2Si_2O_5(OH)_4$), mullite ($Al_2SiO_5$), pyrophyllite ($Al_2Si_4O_{10}(OH)_2$), kyanite ($Al_2OSiO_4$), sillimanite ($Al_2SiO_5$), attapulgite (($Mg,Al)_5Si_8O_{20}.4H2O$), mica, and combinations thereof.

The polymerized units derived from (C)(1) one or more aminocarboxylic acid compounds or their salts comprise those having aminocarboxylic groups of at least one of the following structures:

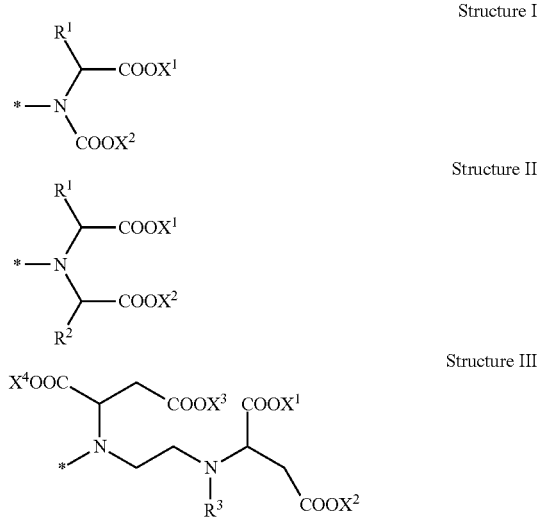

wherein $R^1$ and $R^2$ are each, independently, hydrogen, $COOX^3$ or $COOX^4$; $X^1$, $X^2$, $X^3$ and $X^4$ are each, independently, hydrogen or a monovalent cation; $R^3$ is hydrogen or a unit derived from a polymerizable monomer; and

* is the location at which the aminocarboxylic group is bound to the chelating polymer at a unit derived from a polymerizable monomer, or at a unit derived from an ethylenically unsaturated monomer.

In some embodiments, the (C)(1) one or more aminocarboxylic acid compounds or their salts may be selected from the group consisting of: iminodiacetic acid (IDA), iminodisuccinic acid (IDS), ethylenediamine triacetic acid (ED3A), ethylenediamine disuccinic acid (EDDS), and their salts.

Furthermore, in some embodiments, the (C)(2) one or more polymerizable monomers may be selected from the group consisting of: glycidyl methacrylate (GMA), allyl glycidyl ether (AGE), vinylbenzyl chloride (VBC), allyl bromide, and their derivatives.

Some embodiments of the aqueous opaque coating formulation comprise units derived from (C)(3) one or more ethylenically unsaturated monomers which are selected from the group consisting of: carboxylic acids, esters of carboxylic acids, maleic acids, styrenes, sulfonic acids, and combinations thereof.

In some embodiments, for example, the aqueous opaque coating formulation comprises: (A) from 1% to 95%, by weight, of the aqueous solvent, (B) from 0.1% to 85%, by weight, of the inorganic material; and (C) from 5% to 80%, by weight, of the chelating polymer, based on the total weight of the aqueous opaque coating formulation.

The present invention also provides a method for providing an opaque film for covering a substrate having a surface which comprises applying, to the surface of the substrate, the aqueous opaque coating formulation comprising: (A) an aqueous solvent; (B) an inorganic pigment; and (C) a chelating polymer, as described above.

DETAILED DESCRIPTION OF THE INVENTION

All percentages stated herein are weight percentages (wt %), unless otherwise indicated.

Temperatures are in degrees Celsius (° C.), and "ambient temperature" means between 20° C. and 25° C., unless specified otherwise.

As used herein, the term "(meth)acrylic" includes acrylic acid and methacrylic acid. "Polymer" means a polymeric compound or "resin" prepared by polymerizing monomers, whether of the same or different types. Homopolymers are generally understood to be polymeric compounds which have been prepared from a single type of monomer. Similarly, copolymers are polymeric compounds prepared from at least two different types of monomers. For example, an acrylic acid polymer comprising polymerized units derived only from acrylic acid monomer is a homopolymer, while a polymer comprising polymerized units derived from acrylic acid, methacrylic acid and butyl acrylate is a copolymer. As used herein, the generic term "polymer" includes the terms "homopolymer," "copolymer," as well as "random" polymers and "block" polymers.

The term "polymerized units derived from" as used herein refers to polymer molecules that are synthesized according to polymerization techniques wherein a product polymer contains "polymerized units derived from" the constituent monomers which are the starting materials for the polymerization reactions. The proportions of constituent monomers, based on the total of all constituent monomers, that are used as starting materials for a polymerization reaction are assumed to result in a polymer product having the same proportions of units derived from those respective constituent monomers. For example, where 80%, by weight, of acrylic acid monomer and 20%, by weight, of methacrylic acid monomer are provided to a polymerization reaction, the resulting polymer product will comprise 80% by weight of units derived from acrylic acid and 20% by weight of units derived from methacrylic acid. This is often written in abbreviated form as 80% AA/20% MAA. Similarly, for example, where a particular polymer is said to comprise units derived from 50% by weight acrylic acid, 40% by weight methacrylic acid, and 10% by weight itaconic acid (i.e., 50% AA/40% MAA/10% IA), then the proportions of the constituent monomers provided to the polymerization reaction can be assumed to have been 50% acrylic acid, 40% methacrylic acid and 10% itaconic acid, by weight, based on the total weight of all three constituent monomers.

"Polymerizable monomers" generally means monomers or other molecule that have at least one carbon-carbon double bond and is capable of forming additional covalent bonds with other monomers or molecules of its kind, other polymerizable monomers or molecules, or polymers having polymerizable pendant groups, under normal polymerization conditions, and become incorporated in to the product polymer.

"Ethylenically unsaturated monomers" means molecules having one or more double carbon-carbon bonds, which renders them polymerizable. Monoethylenically unsaturated monomers have one carbon-carbon double bond, while multi-ethylenically unsaturated monomers have two or more carbon-carbon double bonds.

As used herein, ethylenically unsaturated monomers include, without limitation, carboxylic acids, esters of carboxylic acids, maleics, styrenes and sulfonic acids.

Carboxylic acid monomers include, for example, acrylic acid, methacrylic acid, and mixtures thereof. Maleic monomers include, for example, maleic acid, maleic anhydride, and substituted versions thereof. Sulfonic acid monomers include, for example, 2-(meth)acrylamido-2-methylpropane-sulfonic acid, 4-styrenesulfonic acid, vinyl sulfonic acid, 2-sulfoethyl(meth)acrylic acid, 2-sulfopropyl(meth) acrylic acid, 3-sulfopropyl(meth)acrylic acid, and 4-sulfobutyl (meth) acrylic acid. Further examples of ethylenically unsaturated monomers include, without limitation, itaconic acid, crotonic acid, vinyl acetic acid, acryloxypropionic acid, methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butyl acrylamide, N-methyl acrylamide, N,N-dimethyl acrylamide; acrylonitrile, methacryionitrile, allyl alcohol, allyl sulfonic acid, allyl phosphonic acid, vinylphosphonic acid, dimethylaminoethyl acrylate, dimethylaminoethyl methacrylate, phosphoethyl methacrylate, phosphonoethyl methacrylate (PEM), and sulfonoethyl methacrylate (SEM), N-vinyl pyrolidone, N-vinylformamide, N-vinylimidazole, ethylene glycol diacrylate, trimethylotpropane triacrylate, diallyl phthalate, vinyl acetate, styrene, 2-acrylamido-2-methyl propane sulfonic acid (AMPS) and its salts or combinations thereof.

The term "vinyl monomers" refers to monomers that contain a —CH=CH$_2$ group.

Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate.

The term "allyl monomers" refers to monomers that contain a —CH$_2$CH=CH$_2$ group.

Examples of allyl monomers include, but are not limited to, allyl glycidyl ether (AGE), phenyl glycidyl ether, vinylbenzyl chloride (VBC), and allyl bromide.

As will be recognized by persons of ordinary skill in the relevant art, attaching a chelating compound to a polymer may be accomplished by grafting chelating groups, such as amines or amine derivatives, to an acrylic polymer subsequent to the polymerization reaction which produces the acrylic polymer. See, for example, U.S. Pat. No. 3,331,773. In general, chelating compounds have the ability to form stable soluble complexes with metal ions and thus prevent their precipitation.

Chelation is characterized by the equilibrium reaction between a metal ion and the functional group of the chelating compound. The most effective chelating compounds have the capacity to bind a large number of metal ions and have a greater stability associated with the formed complex.

Chelating compounds are well known and include such compounds as amino acids and their derivatives, such as ethylenediaminetetraacetic acid (EDTA) and other polyalkylenepolyaminepolyacetic acids, including polyacids of the alkylol substituents of the polyamines. Other chelating compounds have active groups consisting of carbonyl radicals, sulfonic acid radicals, amine radicals, phosphonic acid radicals, and the like.

Applicants have discovered that polymers having chelating functionality (i.e., "chelating polymers") where one or more aminocarboxylate-type chelating compounds have been incorporated directly into the polymer during polymerization actually provide improved performance when used in aqueous opaque coating formulations compared to polymers having chelating compounds grafted onto them post-polymerization. This appears to be true regardless of whether the chelating polymers are formed by in situ polymerization of chelating compounds or their salts with particular polymerizable monomers and one or more ethylenically unsaturated monomers, or by first combining, by reaction, the chelating compounds with the particular polymerizable monomers to form polymerizable aminocarboxylic acid monomers or their salts, and then polymerizing these aminocarboxylic acid monomers or their salts with one or more ethylenically unsaturated monomers. The two methods of forming suitable chelating polymers for use in the aqueous opaque coating formulations and method of the present invention will be described in further detail hereinafter.

In one embodiment, the present invention provides aqueous opaque coating formulations suitable for use as paints and other film-forming compositions, which have excellent hiding strength, as well as performance properties, such as tint strength, viscosity, freeze/thaw stability, and stain resistance, which are comparable to, or better than, those of traditional carboxylic acid-based composite particles previously used in aqueous opaque coating formulations.

More particularly, the aqueous opaque coating formulations of the present invention comprise: (A) an aqueous solvent; (B) an inorganic material; and (C) a chelating polymer comprising, as polymerized units derived from, (1) one or more aminocarboxylic acid compounds or their salts; (2) one or more polymerizable monomers comprising a vinyl group, an allyl group, or both, and, optionally, an epoxy group; and (3) one or more ethylenically unsaturated monomers.

In some embodiments, for example, the aqueous opaque coating formulation of the present invention will comprise from 1% to 95%, by weight, of the aqueous solvent; from 0.1% to 85% of the inorganic pigment; and from 5% to 80%, by weight, of the chelating polymer, based on the total weight of the aqueous opaque coating formulation.

For example, without limitation, the aqueous opaque coating formulation may comprise at least 3%, or at least 10%, or even at least 30%, by weight, of the aqueous solvent, based on the total weight of the aqueous opaque coating formulation. Furthermore, for example, the aqueous opaque coating formulation may comprise up to 70%, or up to 80%, or even up to 90%, by weight, of the aqueous solvent, based on the total weight of the aqueous opaque coating formulation.

For example, without limitation, the aqueous opaque coating formulation may comprise at least 0.3%, or at least 2%, or at least 10%, or even at least 30%, by weight, of the inorganic pigment, based on the total weight of the aqueous opaque coating formulation. Furthermore, for example, the aqueous opaque coating formulation may comprise up to 80%, or up to 70%, or up to 60%, or even up to 45%, by weight, of the inorganic pigment, based on the total weight of the aqueous opaque coating formulation.

In addition, the aqueous opaque coating formulation may, for example, without limitation, comprise at least 10%, or at least 15%, or even at least 20%, by weight, of the chelating polymer, based on the total weight of the aqueous opaque coating formulation. Furthermore, for example, the aqueous opaque coating formulation may comprise up to 65%, or up to 70%, or even up to 75%, by weight, of the chelating polymer, based on the total weight of the aqueous opaque coating formulation.

Suitable aqueous solvents comprise, for example, without limitation, from 5% to 95% of water, and from 1% to 50% of one or more other solvents, by weight, based on the total weight of the aqueous solvent.

In some embodiments, for example, without limitation, the aqueous solvent may comprise at least 5%, or at least 10%, or even at least 20%, by weight, of water, based on the total weight of the aqueous solvent. Also, the aqueous solvent may, for example, comprise up to up to 50%, or up to 70%, or even up to 85%, by weight, of water, based on the total weight of the aqueous solvent.

Furthermore, in some embodiments, for example, without limitation, the aqueous solvent may comprise at least 2%, or at least 5%, or even at least 10%, by weight, of the one or more other solvents, based on the total weight of the aqueous solvent.

Also for example, the aqueous solvent may comprise up to up to 20%, or up to 25%, or even up to 35%, by weight, of water, based on the total weight of the aqueous solvent.

Compounds suitable for use as the one or more other solvents may, for example, be selected from coalescing solvents, plasticizing solvents, or combinations thereof.

Suitable coalescing solvents, for example, may be selected from Butoxyethyl PROPASOL™, Butyl CARBITOL™, Butyl CELLOSOLVE™ Acetate, Butyl CELLOSOLVE™, Butyl DIPROPASOL™, Butyl PROPASOL™, CARBITOL™ PM-600, CARBITOL™ Low Gravity, CELLOSOLVE™ Acetate, CELLOSOLVE™, Ester EEP™, FILMER IBT™, Hexyl CARBITOL™, Hexyl CELLOSOLVE™, Methyl CARBITOL™, Methyl CELLOSOLVE™ Acetate, Methyl CELLOSOLVE™, Methyl DIPROPASOL™, Methyl PROPASOL™ Acetate, Methyl PROPASOL™, Propyl CARBITOL™, Propyl CELLOSOLVE™, Propyl DIPROPASOL™ and Propyl PROPASOL™, DOWANOL™ PM, DOWANOL™ DPM, DOWANOL™ PMA, DOWANOL™ DPMA, DOWANOL™ DPnP, DOWANOL™ PnB, among others, all of which are commercially available from Dow Chemical Company of Midland, Mich., U.S.A.

Suitable plasticizing solvents, for example, may be selected from ethylene glycol phenyl ether (commercially available as DOWANOL™ EPh from Dow Chemical Company), propylene glycol phenyl ether (commercially available as DOWANOL™ PPh from Dow Chemical Company); DALPAD A (commercially available from Dow Chemical Company); 2,2,4-Trimethyl-1,3-pentanediol diisobutyrate; tributoxy ethyl phosphate; dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products commercially available under the trade designations DBE, DBE-3, DBE-4, DBE-5, DBE-6. DBE-9, DBE-IB, and DBE-ME from E.I. du Pont de Nemours and Company, of Wilmington, Del., U.S.A.); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate, among others.

The (B) inorganic materials include compounds typically used in aqueous opaque coating formulations such as, without limitation pigments, extenders and fillers. Examples of suitable inorganic pigments include, without limitation, titanium dioxide ($TiO_2$, white), cobalt(II) stannate ($Co_2SnO_4$, blue), cadmium selenide (CdSe, red), cadmium sulfide (CdS, yellow), calcium copper silicate ($CaCuSi_4O_{10}$, blue), and hydrated chromium(III) oxide ($Cr_2O_3$, green). Extenders, or fillers, typically used in aqueous opaque coating formulations include, without limitation, talc ($Mg_3Si_4O_{10}(OH)_2$), calcium carbonate ($CaCO_3$), nepheline syenite (characterized as having a high ratio of ($Na_2O+K_2O)/SiO_2+(Na_2O+K_2O)/Al_2O_3$), barium sulfate ($BaSO_4$), hydrous kaolin ($Al_2Si_2O_5(OH)_4$), mullite ($Al_2SiO_5$), pyrophyllite ($Al_2Si_4O_{10}(OH)_2$), kyanite ($Al_2OSiO_4$), sillimanite ($Al_2SiO_5$), attapulgite (($Mg,Al)_5Si_8O_{20}$.4H2O), and mica, among many others.

In the chelating polymer (C), the polymerized units derived from (C)(1) one or more aminocarboxylic acid compounds or their salts comprise those having aminocarboxylic groups of at least one of the following structures:

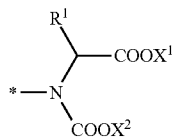

Structure I

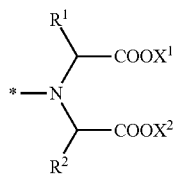

Structure II

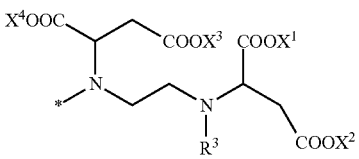

Structure III wherein $R^1$ and $R^2$ are each, independently, hydrogen, $COOX^3$ or $COOX^4$; $X^1$, $X^2$, $X^3$ and $X^4$ are each, independently, hydrogen or a monovalent cation; $R^3$ is hydrogen or a unit derived from a polymerizable monomer; and

* is the location at which the aminocarboxylic group is bound to the chelating polymer at a unit derived from a polymerizable monomer, or at a unit derived from an ethylenically unsaturated monomer.

Suitable monovalent cations include, without limitation, one or more of the following: $Na^+$, $K^+$, $NH_4^+$. The monovalent cations will enable the chelating polymer to bind with the inorganic materials which contain cations such as $Ca^{2+}$, $Mg^{2+}$, $Ba^{2+}$, $Sr^{2+}$, $V^{2+}$, $Mn^{2+}$, $Fe^{2+}$, $Al^{3+}$, $Zr^{2+}$, $Co^{2+}$, $Cd^{2+}$, $Zn^{2+}$, $TiO^{2+}$, $Pb^{2+}$, $Y^{3+}$, $Pd^{2+}$, $Ni^{2+}$, $VO^{2+}$, $Cu^{2+}$, $Ga^{3+}$, $Ti^{3+}$, $Hg^{2+}$, $Sc^{3+}$, $Th^{4+}$, $In^{3+}$, $Fe^{3+}$, $V^{3+}$, and combinations thereof Aminocarboxylic acid compounds or their salts which are suitable for use as constituent monomers of the chelating polymer include, for example, without limitation, iminodiacetic acid (IDA), iminodisuccinic acid (IDS), ethylenediamine triacetic acid (ED3A), ethylenediamine disuccinic acid (EDDS), or their salts. Of course, mixtures and combinations of different kinds of aminocarboxylic acids or their salts may be suitably included as well.

These exemplary aminocarboxylic compounds have the following pre-reaction structures:

Iminodiacetic acid (IDA), or its salt, for example, has the following general structure:

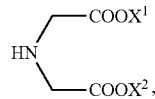

wherein $X^1$ and $X^2$ are each, independently, hydrogen or a monovalent cation, such as those listed above.

Iminodisuccinic acid (IDS) or its salt, on the other hand, has the following general structure:

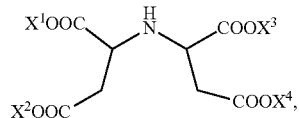

wherein $X^1$, $X^2$, $X^3$ and $X^4$ are each, independently, hydrogen or a monovalent cation, such as those listed above.

Ethylenediamine triacetic acid (ED3A), or its salt, has the following general structure:

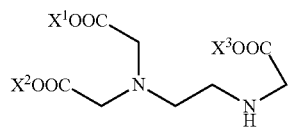

wherein $X^1$, $X^2$ and $X^3$ are each, independently, hydrogen or a monovalent cation, such as those listed above.

Ethylenediamine disuccinic acid (EDDS), or its salt, has the following general structure:

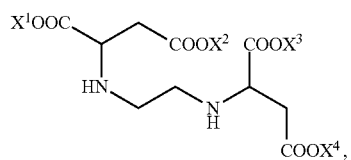

wherein $X^1$, $X^2$, $X^3$ and $X^4$ are each, independently, hydrogen or a monovalent cation, such as those listed above.

The units of the chelating polymer which are derived from (C)(2) one or more polymerizable monomers comprise a vinyl group ($—CH=CH_2$), an allyl group ($—CH_2CH=CH_2$), or both, and, optionally, an epoxy group. These units may, for example, without limitation, have one or more of the following structures:

a) $—CH_2CH=CH_2$ b) $—CH_2CH(OH)CH_2OCH_2CH=CH_2$ c) $—CH_2CH(OH)CH_2OCOC(CH_3)=CH_2$ d) $—CH_2CH_2NCH_2CH(OH)CH_2OCOC(CH_3)=CH_2$
     $|$
     $CH_2—Y^1$ e) $—CH_2CH_2NCH_2CH(OH)CH_2OCOCH=CH_2$
     $|$
     $CH_2—Y^1$

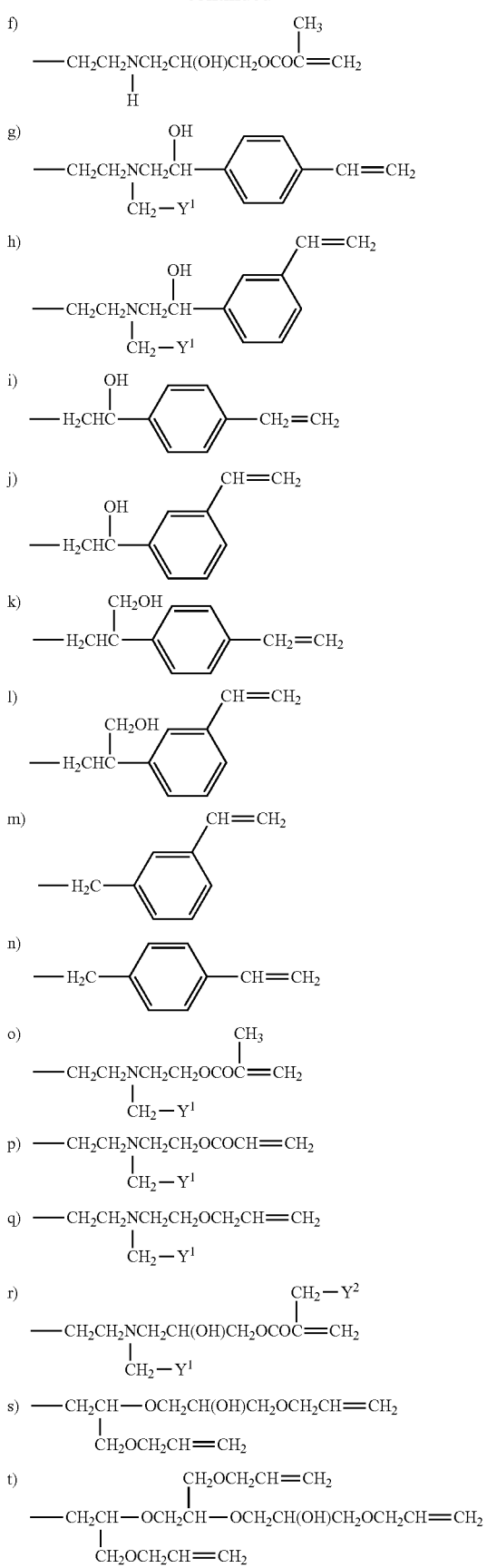
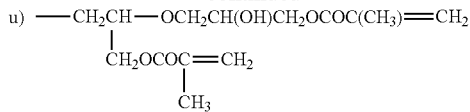

wherein, $Y^1$ and $Y^2$ are each, independently and where present, hydrogen, $COOX^5$ or $COOX^6$, and $X^5$ and $X^6$ are each, independently, hydrogen or a monovalent cation. Suitable monovalent cations include, without limitation, one or more of the following: $Na^+$, $K^+$, and $NH_4^+$.

Additionally, as will be readily recognized by persons of ordinary skill in the relevant art, monomers suitable for deriving these units (C)(2) of the chelating polymer include, for example, without limitation, glycidyl methacrylate (GMA), allyl glycidyl ether (AGE), vinylbenzyl chloride (VBC), and allyl bromide, and their derivatives.

Ethylenically unsaturated monomers from which the units (C)(3) of the chelating polymer are derived include, without limitation, those listed hereinabove. Preferred ethylenically unsaturated monomers include carboxylic acids, esters of carboxylic acids, maleic acids, styrenes, sulfonic acids and combinations thereof.

Particularly suitable ethylenically unsaturated monomers include, for example, those containing an acidic functional group selected from one or more of carboxylic, sulfonic and phosphonic groups. For example, suitable carboxylic acid monomers include, without limitation, monoethylenically unsaturated ($C_3$-$C_9$) carboxylic acid monomers, such as unsaturated monocarboxylic and dicarboxylic acid monomers.

For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof.

Additional suitable monoethylenically unsaturated monomers are those containing sulfonic acid or phosphonic groups include, for example, 2-acrylamido-2-methyl-1-propane-sulfonic acid, 2-methacrylamido-2-methyl-1-propanesulfonic acid, 3-methacryl-amido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrene-sulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

As a further example, the one or more monoethylenically unsaturated monomers may comprise one or more (meth)acrylic monomers containing one or more pendant reactive functional groups selected from hydroxy, thiol, and amino groups. Suitable hydroxy-functional (meth)acrylic monomers include, for example, hydroxyl ($C_1$-$C_4$)alkyl(meth)acrylates, such as hydroxyethyl methacrylate, hydroxyethyl acrylate, hydroxypropyl methacrylate and hydroxypropyl acrylate. Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethyl-aminopropyl methacrylate and dimethylaminopropyl acrylate.

Suitable thiol-functional (meth)acrylic monomers include, for example, 2-mercaptopropyl methacrylate.

As a still further example, the one or more monoethylenically unsaturated monomers may comprise one or more ($C_1$-$C_{20}$)alkyl(meth)acrylate ester monomers, such as, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl(meth)acrylate, isodecyl(meth)acrylate, undecyl (meth)acrylate, dodecyl(meth)acrylate (also known as lauryl(meth)acrylate), tridecyl(meth)acrylate, tetradecyl(meth)acrylate (also known as myristyl(meth)acrylate), pentadecyl(meth)acrylate, hexadecyl(meth)acrylate (also known as cetyl(meth)acrylate), heptadecyl(meth)acrylate, octadecyl(meth)acrylate (also known as stearyl(meth) acrylate), nonadecyl(meth)acrylate, eicosyl(meth)acrylate and combinations thereof. Typically, the ($C_1$-$C_{20}$)alkyl(meth)acrylate esters are ($C_1$-$C_8$)alkyl(meth)acrylate esters and preferably ($C_1$-$C_8$)alkyl acrylate esters; more preferably, the ($C_1$-$C_{20}$)alkyl(meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

The one or more monoethylenically unsaturated monomers used to prepare the water insoluble polymer binders, may comprise one or more vinylaromatic monomers, such as, for example, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether.

It is also possible for the water insoluble polymer resins to comprise, as polymerized units, 0-50%, such as 0-25%, of one or more other copolymerizable monomers.

Suitable other copolymerizable monomers include, for example, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and amides of ethylenically unsaturated ($C_3$-$C_6$)carboxylic acids, amides of ethylenically unsaturated ($C_3$-$C_6$)carboxylic acids that are substituted at the nitrogen by one or two ($C_1$-$C_4$)alkyl groups, acrylamide, methacrylamide and N-methylol(meth)acryl-amide.

The constituent monomers, (C)(1), (C)(2) and (C)(3), from which the chelating polymer is derived may, for example, be provided individually, or in various mixtures, to the polymerization reaction process which produces the chelating polymer. This is referred to herein as the "in situ" method of preparing the chelating polymer, i.e., where all three categories of constituent monomers are supplied and polymerized together.

Alternatively, the chelating polymer may be produced by providing a polymerizable aminocarboxylic acid monomer or its salt, which is the reaction product of the (C)(1) one or more aminocarboxylic acid compounds or their salts and the (C)(2) one or more polymerizable monomer, to the polymerization reaction, along with the (C)(3) one or more ethylenically unsaturated monomers. In other words, the one or more polymerizable monomers comprising a vinryl group, an allyl group, or both, and optionally an epoxy group are first modified by reacting with (C)(1) one or more aminocarboxylic acid compounds or their salts, thereby forming polymerizable aminocarboxylic acid monomers or their salts. The polymerizable aminocarboxylic acid monomers or their salts are then polymerized with one or more ethylenically unsaturated monomers to produce the chelating polymers suitable for use in the aqueous opaque coating formulations and method of the present application.

In some embodiments, for example, polymerizable aminocarboxylic acid monomers or their salts are prepared from a polymerizable monomer and at least one chelating compound selected from the group consisting of: iminodiacetic acid; iminodisuccinic acid; ethylenediamine triacetic acid; and ethylenediamine disuccinic acid. In such embodiments, the one or more polymerizable monomers may, for example without limitation, be glycidyl methacrylate (GMA), allyl ether (AGE), vinylbenzyl chloride (VBC) or mixtures thereof. The resulting polymerizable aminocarboxylic acid monomers or their salts are then polymerized with one or more ethylenically unsaturated monomers. Preferred ethylenically unsaturated monomers include: butyl acrylate (BA), methyl methacrylate (MMA), methacrylic acid (MAA), itaconic acid (IA), styrene (STY), and their salts and derivatives.

Furthermore, in some embodiments, the chelating polymer (C) in the aqueous opaque coating formulation comprises (1) from 1% to 99%, by weight of the one or more vinyl aminocarboxylic acid monomers; and (2) from 1% to 99%, by weight of the one or more ethylenically unsaturated monomers, based on the total weight of the chelating polymer (C).

In some embodiments of the aqueous opaque coating formulation according to the present invention, the chelating polymer may further comprise units derived from one or more crosslinking monomers. Crosslinking monomers are monomers having two or more ethylenically unsaturated groups, and may include, for example, without limitation, divinylaromatic compounds, di-, tri- and tetra-(meth)acrylate esters, di-, tri- and tetra-allyl ether or ester compounds and allyl(meth)acrylate. Preferred crosslinking monomers for use in the present invention include, for example, divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Especially preferred crosslinking monomers include DVB, ALMA, EGDMA, HDDA and BGDMA. When present in some embodiments, the one or more crosslinking monomers may be bi—, tri-, or tetra-ethylenically unsaturated, or even a combination thereof.

The chelating polymer may comprise from 0.3% to 3% of units derived from one or more crosslinking monomers, by weight, based on the total weight of the chelating polymer. For example, in some embodiments, the chelating polymer may comprise at least 0.4%, or at least 0.6%, or at least 0.8%, or at least 0.9%, or even at least 1.1%, by weight, based on the total weight of the chelating polymer. Similarly, For example, in some embodiments, the chelating polymer may comprise up to 2.8%, or up to 2.5%, or up to 2.1%, or up to 1.8%, or even up to 1.5%, by weight, based on the total weight of the chelating polymer.

Copolymerizing polymerizable aminocarboxylic acid monomers or their salts with traditional ethylenically unstaurated monomers, such as butyl acrylate (BA), methyl methacrylate (MMA), methacrylic acid (MAA), itaconic acid (IA), and styrene (STY) produces unique aqueous emulsion compositions comprising chelating polymers (C) that are capable of binding metals at high loading levels and, therefore, suitable for use in aqueous opaque coating formulations having excellent tint strength, as well as optimal viscosity, freeze/thaw stability and stain resistance.

Applicants have found that the presence of aminocarboxylate groups in the chelating polymer improves the ability of the latex polymer particles to adsorb to the inorganic materials, such as $TiO_2$ particles, in aqueous opaque coating formulations. Polymerizable chelating monomers prepared and evaluated included vinyl aminocarboxylate monomers based on the reaction of iminodiacetic acid (IDA) or ethylenediaminetriacetic acid (ED3A) (i.e., amine compounds) with glycidyl methacrylate (GMA), allyl ether (AGE) or vinylbenzyl chloride (VBC), or their derivatives (i.e., traditional vinyl monomers).

The relatively new class of chelant-functionalized latex polymers discussed hereinabove provides improved adsorption onto the surface of inorganic materials, such as $TiO_2$. More importantly, when the composite particles comprising an inorganic particle surrounded by the aforesaid chelating polymer particles are included in opaque coating formulations of the present invention, improved hiding efficiency is seen compared to traditional carboxylic acid functionalized latex adsorbers. An additional advantage of using the chelating polymers described above in aqueous opaque coating formulations is that viscosity stability is maintained at least as well as compared to phosphate-containing composite particles, such as PEM-containing latex polymers It has been demonstrated that polymerizable aminocarboxylic monomers [(C)(1) +(C)(2)] can be synthesized and successfully polymerized with traditional vinyl monomers (C)(3) to produce the chelating polymers useful in opaque coatings formulations as described herein. Specifically, we found that the presence of these new aminocarboxylate groups improve latex adsorption on $TiO_2$ surfaces Assessment of adsorption ability of chelating polymers to inorganic materials was performed using chelating polymers synthesized from one or more ethylenically unsaturated monomers (C)(3) and polymerizable aminocarboxylate monomers, which were the reaction products of iminodiacetic acid (IDA) (i.e., an aminocarboxylic compound or its salt (C)(1)) with glycidyl methacrylate (GMA), allyl ether (AGE) or vinyl epoxy chloride (VBC) (i.e., polymerizable monomers (C)(2)).

Further possibilities for the synthesis of polymerizable aminocarboxylate monomers which may then be polymerized with one or more ethylenically unsaturated monomers (C)(3), as described above, include ethylenediamine triacetic acid (ED3A) (C)(1) or its salt, with AGE, or another polymerizable monomer (C)(2).

Reaction schemes for these reactions are, for example, as follows.

Sample Reaction Schemes for Vinyl Aminocarboxylate Monomers

1)

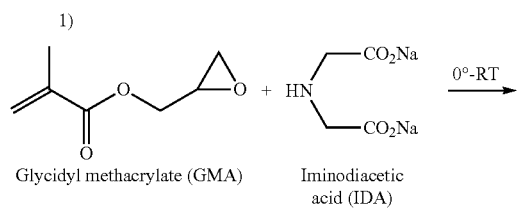

Glycidyl methacrylate (GMA)    Iminodiacetic acid (IDA)

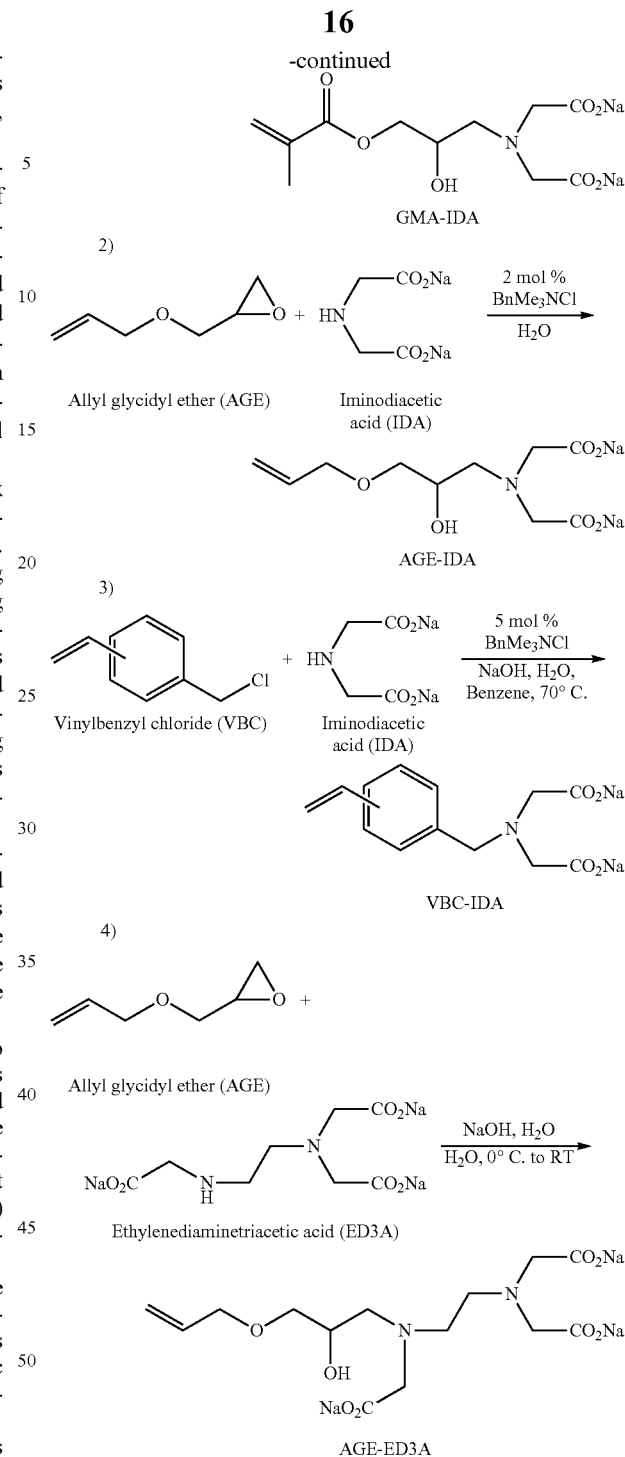

Synthesis schemes of polymerizable aminocarboxylate monomers shown above: 1) epoxide ring opening of GMA with IDA, 2) epoxide ring opening of AGE with IDA, 3) nucleophillic substitution of VBCl with IDA, and 4) epoxide ring opening of AGE with ED3A.

The reactants in the foregoing synthesis reactions may be provided in any suitable ratio, as is readily determinable by persons of ordinary skill. The synthesis reactions for making the polymerizable aminocarboxylate monomers may be conducted at ambient temperatures. A phase transfer catalyst is often useful, but is not particularly limited. Various phase transfer catalysts useful for the above-described reaction are known to persons of ordinary skill in the relevant art. For example, without limitation, suitable phase transfer catalysts include benzyltrimethylammonium chloride, tetra-n-butylammonium bromide, methyltrioctylammonium chloride, hexadecyltributylphosphonium bromide, dimethyldiphenylphosphonium iodide, and methyltriphenoxyphosphonium iodide.

Of course, as will be recognized by persons of ordinary skill, the polymerizable aminocarboxylate monomers may be produced in their acidic form, or as salts thereof, wherein one or more hydrogen atoms has been substituted for a monovalent cation. The monovalent cations may be, for example, one or more of $Na^+$, $K^+$, $NH_4^+$.

The method of polymerization employed to prepare the chelating polymer useful in the aqueous opaque coating formulation and method of the present invention is not particularly limited and may be any method known, now or in the future, to persons of ordinary skill including, but not limited to, emulsion, solution, addition and free-radical polymerization techniques. This is true regardless of whether the three constituents of the chelating polymer are provided separately and polymerized in situ, or one or more aminocarboxylic acids or their salts are first reacted with one or more polymerizable monomers to produce one or more polymerizable aminocarboxylate monomers, which are then polymerized with one or more ethylenically unsaturated monomers.

For example, in some embodiments, the chelating polymer may be prepared by performing free-radical polymerization reactions. Among such embodiments, some involve the use of one or more initiators. An initiator is a molecule or mixture of molecules that, under certain conditions, produces at least one free radical capable of initiating a free-radical polymerization reaction. Photoinitiators, thermal initiators, and "redox" initiators, among others, are suitable for use in connection with the present invention. Selection of particular initiators will depend on the particular monomers being polymerized with one another and is within the capability of persons of ordinary skill in the relevant art. Another category of suitable initiators is the group of persulfates, including, for example, sodium persulfate. In some embodiments one or more persulfate is used in the presence of one or more reducing agents, including, for example, metal ions (such as, for example, ferrous ion), sulfur-containing ions (such as, for example, $S2O3(=)$, $HSO3(-)$, $SO3(=)$, $S2O5(=)$, and mixtures thereof), and mixtures thereof.

Production of the polymer having chelating functionality in accordance with the present invention may also involve the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. In some embodiments, the chain regulator includes sodium metabisulfite. Other suitable chain regulators include, for example without limitation, OH-containing compounds which are suitable for use in a mixture with water to form a solvent (such as isopropanol and propylene glycol).

Additionally, in some embodiments, the chelating polymer may be produced by aqueous emulsion polymerization techniques. Generally, aqueous emulsion polymerization involves monomer, initiator, and surfactant in the presence of water. The emulsion polymerization may be performed by a method that includes the steps of adding one or more monomers (which may be neat, in solution, in aqueous emulsion, or a combination thereof) to a vessel that contains, optionally with other ingredients, water.

Initiators suitable for use in emulsion polymerization processes include, for example, water soluble peroxides, such as sodium or ammonium persulfate; oxidants, such as persulfates or hydrogen peroxide, in the presence of reducing agents, such as sodium bisulfite or isoascorbic acid and/or polyvalent metal ions, to form an oxidation/reduction pair to generate free radicals at any of a wide variety of temperatures; water soluble azo initiators, including cationic azo initiators, such as 2,2'-azobis(2-methylpropionamide)dihydrochloride. Furthermore, the emulsion polymerization process may employ one or more oil-soluble initiators, including, for example, oil-soluble azo initiators.

One or more surfactants may also be employed during emulsion polymerization. For example, at least one of the surfactants may be selected from alkyl sulfates, alkylaryl sulfates, alkyl or aryl polyoxyethylene nonionic surfactants, and mixtures thereof. The use, application and benefits of the present invention will be clarified by the following discussion and description of exemplary embodiments of the present invention.

EXAMPLES

The abbreviations used in the following example are listed in Table 1 below and are to be understood as having the meaning set forth therein.

Different latex polymers were synthesized and analyzed, as described below. Examples 1 and 2 are both examples of chelating polymers in accordance with the present invention. Comparative Example A is an example of a polymer not having any chelating functionality and also not containing any phosphorus-containing monomer. Each of Comparative Examples B and C are polymers which contain 2-phosphoethymethacrylate, a phosphate-containing monomer, without any chelating functionality, but made by different processes where Comparative Polymer C is a multi-stage polymer.

Table 2 lists the compositions of the various materials and process stream compositions used to synthesize the latex polymers of Examples 1 and 2 and Comparative Examples A and B.

TABLE 1

| ABBREVIATIONS | |
|---|---|
| APS | Ammonium persulfate |
| AGE-IDA | Allylglycidyl ether-iminodiacetic acid chelant monomer |
| AGE-ED3A | Allylglycidyl ether-ethylenediaminetriacetic acid monomer |
| BA | Butyl acrylate |
| EA | Ethyl acrylate |
| EDTA | Ethylenediamine tetraacetic acid |
| GMA-IDA | Glycidyl methacrylate-iminodiacetic acid chelant monomer |
| IAA | Isoascorbic acid |
| IDA | Iminodiacetic acid |
| MMA | Methyl methacrylate |
| MAA | Methacrylic acid |
| nDDM | n-Dodecylmercaptan |
| PEM | 2-Phosphoethyl methacrylate |
| STY | Styrene |
| t-BHP | t-Butyl hydroperoxide |
| t-AHP | t-Amyl hydroperoxide |
| UMA | Ureido methacrylate |
| VBC-IDA | Vinylbenzyl chloride-iminodiacetic acid |

TABLE 2

| MATERIAL | EXAMPLE 1 | EXAMPLE 2 | COMPARATIVE A | COMPARATIVE B |
|---|---|---|---|---|
| REACTOR CHARGE | | | | |
| D.I. WATER | 50.00 | 450.00 | 420.00 | 420.00 |
| DISPONIL FES 993 (30%)[1] | 1.50 | 1.52 | 1.62 | 1.53 |
| ACTRENE (5 PPM) | 0.22 | 0.21 | 0.21 | 0.22 |
| FEED A | | | | |
| D.I. WATER | 260.00 | 260.02 | 260.00 | 260.02 |
| DISPONIL FES 993 (30%)[1] | 19.02 | 19.13 | 28.45 | 28.40 |
| BA | 272.00 | 263.54 | 272.03 | 272.12 |
| EA | 297.50 | 289.00 | 306.00 | 297.50 |
| MMA | 250.74 | 250.70 | 259.31 | 259.33 |
| MAA | 12.78 | 12.82 | 12.76 | 4.27 |
| nDDM | 1.05 | 1.06 | 1.02 | 1.03 |
| PEM | 0.00 | 0.00 | 0.00 | 17.05 |
| D.I. WATER, rinse | 21.80 | 40.08 | 20.20 | 22.21 |
| FEED B | | | | |
| DI WATER DILUTION | 68.65 | 78.10 | 0.00 | 0.00 |
| DISPONIL FES 993 (30%)[1] | 9.52 | 9.58 | 0.00 | 0.00 |
| GMA-IDA (23.4%) | 72.73 | 145.48 | 0.00 | 0..00 |
| D.I. WATER, rinse | 20.30 | 19.50 | 0.00 | 0.00 |
| FEED C | | | | |
| MONOMER EMULSION SEED | 25.08 | 25.06 | 25.06 | 25.03 |
| D.I. WATER, rinse | 10.63 | 10.33 | 10.29 | 10.32 |
| FEED D | | | | |
| APS | 2.55 | 2.55 | 2.60 | 2.56 |
| D.I. WATER | 12.04 | 12.15 | 12.01 | 12.05 |
| FEED E | | | | |
| UMA (50%) | 17.02 | 17.07 | 17.02 | 17.02 |
| D.I. WATER, rinse | 10.01 | 10.04 | 5.09 | 5.14 |
| FEED F | | | | |
| APS | 0.70 | 0.72 | 0.71 | 0.70 |
| D.I. WATER | 50.00 | 50.04 | 50.29 | 50.08 |
| FEED G | | | | |
| IRON SULFATE HEPTAHYDRATE (0.15%) | 8.51 | 10.23 | 1.73 | 8.52 |
| FEED H | | | | |
| t-BHP (70%) | 1.0 | 1.21 | 1.21 | 1.23 |
| D.I. WATER | 10.02 | 10.08 | 10.09 | 10.11 |
| FEED I | | | | |
| IAA | 0.73 | 0.70 | 0.70 | 0.71 |
| D.I. WATER | 10.20 | 10.06 | 10.09 | 10.03 |
| FEED J | | | | |
| t-BHP (70%) | 1.26 | 1.22 | 1.21 | 1.25 |
| D.I. WATER | 10.04 | 10.06 | 10.04 | 10.12 |
| FEED K | | | | |
| IAA | 0.73 | 0.75 | 0.73 | 0.71 |
| D.I. WATER | 10.20 | 10.07 | 10.04 | 10.06 |
| FEED L | | | | |
| AQUA AMMONIA (20%) | 5.59 | 10.23 | 5.52 | 17.46 |
| FEED M | | | | |
| KORDEK LX5000 (50%)[2] | 0.93 | 0.99 | 0.90 | 0.90 |
| D.I. WATER | 5.15 | 5.11 | 5.29 | 5.08 |

[1] Commercially available from Cognis Corporation of Cincinnati, Ohio, USA.
[2] Commercially available from The Dow Chemical Company, Midland, Michigan, USA.

Example 1

In a suitable reaction vessel equipped with a thermometer, condenser, and stirrer, the initial reactor charge was heated to 85-86° C. under a nitrogen blanket while Feeds A to M, described in Table 2, were being prepared. At 85° C., Feed C and rinse was added all at once to the reaction vessel and the temperature adjusted to 80-85° C. followed by the kettle charge of Feed D. Within 2 minutes, the onset of polymerization was signaled by a temperature rise of 3° C. to 5° C. and a change in the appearance (color and opacity) of the reaction mixture. When the exotherm ceased, the remaining monomer mixture, Feed A, and a co-feed catalyst solution Feed F were gradually added to the reaction vessel over 125 minutes at about 85° C. At the same time, Feed B was simultaneously added to the reaction vessel over 60 minutes at about 85° C. After 60 minutes, After the end of Feed B, the vessel containing Feed B was rinsed and the rinse was added to the reactor. After the rinse, Feed E was charged to the remainder of Feed B while simultaneously adding to the reactor. After the additions were complete, the reactor contents were held at 85° C. for fifteen minutes. The reactor was then cooled to 60° C. and chased by adding first a shot of Feed G, followed by shots of Feeds H and I. A second chase, fifteen minutes later, consisted of gradually feeding a second redox pair, Feeds J and K over 25 minutes. After the chase, the contents of the reactor were cooled to 40° C. Feed L was added to the reactor over ten minutes. Feed L was then added over 20 minutes to the reaction vessel to adjust the latex pH to 8.0. This was followed by the addition of Feed M over several minutes. The contents of the reactor was then passed through 100 and 325 mesh screens and characterized for solids, pH, viscosity and particle size.

Example 2

The acrylic dispersion of Example 2 was prepared in the same manner as Example 1 except that the 4.0 wt % of the GMA-IDA monomer was added. The polymer was prepared using a monomer emulsion containing a ratio of monomer described in Table 2

Comparative Example A

The acrylic dispersion of Comparative Example A was prepared in the same manner as Example 1 except that the no GMA-IDA monomer was added. The polymer was prepared using a monomer emulsion containing a ratio of monomer described in Table 2.

Comparative Example B

The acrylic dispersion of Comparative Example B was prepared in the same manner as Example 1 except that the no GMA-IDA monomer was added. Instead 2.0% PEM was used. The polymer was prepared using a monomer emulsion containing a ratio of monomer described in Table 2.

Comparative Example C

A first monomer emulsion (ME1) was prepared by mixing deionized water (545 g), Disponil FES-993 surfactant (82.5 g, 30% active), BA (456 g), EA (570 g), MMA (802.75 g), PEM (38 g, 65% active), methacrylic acid (4.75 g), UMA (57 g, 50% active), and n-DDM (2.38 g). A second monomer emulsion (ME2) was prepared by mixing deionized water (25 g), Disponil FES-993 surfactant (30% active, 2.6 g), BA (20 g), and MMA (80 g).

To a 5-liter, 4-necked round bottom flask equipped with a paddle stirrer, a thermometer, a nitrogen inlet, and a reflux condenser was added deionized water (700 g) and (30% active, 13.4 g) Disponil FES-993 surfactant. The contents of the flask were heated with stirring to 86° C. under a nitrogen atmosphere. A buffered solution of ammonium bicarbonate (3.2 g) dissolved in deionized water (25 g) was added to the flask. A portion of ME1 (81 g) was then added, followed by addition of a solution of APS (4 g) dissolved in deionized water (27 g). After the reaction temperature peaked, a mixture made from a solution of 0.15% ferrous sulfate heptahydrate in water (19.8 g) and a 1% solution of EDTA in water (2.9 g) was added. Two co-feed solutions were then fed to the flask over a period of 85 min: the first co-feed solution was made from t-AHP (85% active, 4.0 g), Disponil FES-993 surfactant (1.2 g), and deionized water (95 g), and the second co-feed solution was made from IAA (3.08 g) and deionized water (100 g). After 2 min of the onset of co-feeding, the remaining ME1 was fed to the flask over 80 min while maintaining the temperature at 86 CC. Once the ME1 feed was complete, the vessel containing residual ME1 was rinsed with deionized water, and the rinse added to the flask. The contents of the flask were held at 86° C. for 15 min, after which time the contents of the flask were cooled to 60° C. ME2 was then added to the flask over 5 min. The vessel containing residual ME2 was rinsed with deionized water, and the rinse added to the flask, followed by addition of t-BHP (70% active, 0.5 g) in deionized water (8 g), then a solution of IAA (0.4 g) in deionized water (12 g). A solution of t t-BHP (70% active, 1.0 g) in deionized water (30.0 g) and a solution of IAA (1.0 g) in deionized water (30.0 g) were then fed into the reactor over a period of 45 min to reduce residual monomer, and the polymer was then neutralized to pH 8.0 with aqueous ammonium hydroxide.

Various characteristics of the polymers were measured and are reported below in Table 3. The viscosity of each of the latex polymers was measured in centipoise (cP) using a Brookfield DV-II+ Pro viscometer.

The glass transition temperature ($T_g$) measurements were performed at a heating rate of 10° C./min using a TA Instruments DSC (Model Q1000) equipped with an autosampler and cooled using a refrigeration cooling apparatus. The $T_g$ was reported as the transitional midpoint during the second heat.

TABLE 3

Polymer Characteristics

| Example # | PS (nm) | PH | VISC. (cP) | SOLIDS % | Tg ° C. |
|---|---|---|---|---|---|
| 1 | 122.0 | 8.0 | 273.0 | 45.4 | 1.6 |
| 2 | 136.0 | 8.0 | 1004.0 | 44.2 | 2.3 |
| Comparative A | 140.0 | 8.1 | 149.0 | 50.4 | 3.0 |
| Comparative B | 142.0 | 7.9 | 115.0 | 49.5 | 0.5 |
| Comparative C | 110.0 | 8.0 | — | 49.5 | — |

Evaluation of Paint Formulations for Tint Strength

Each of the aforesaid five sample polymers were blended into aqueous opaque coating formulations, which were then evaluated for their performance as paint coatings with respect to characteristics such as tint strength, viscosity and freeze/thaw strength. The aqueous coating formulations included the polymers as binders and were 0 gm/L VOC semi-gloss paints, as described below: More specifically, all of the sample paint formulations were prepared using the materials listed in Table 4 by adding them to a container in the order listed. Table 6 summarizes the formulation details for the sample paint formulations. In Table 4, "PVC" refers to pigment volume concentration. In both Tables 4 and 5, RM-5000 refers to ACRYSOL™ RM-5000 Rheology Modifier; Ultra E refers to ROPAQUE™ Ultra E Opaque Polymer; RM-895 refers to ACRYSOL™ RM-895 Rheology Modifier and Tamol 165A refers to TAMOL™ DISPERSANT (all of which are commercially available from The Dow Chemical Company of Midland, Mich., USA).

TABLE 4

Interior Semi-Gloss Paint Formulations

| Material Name | g | Level (%) | PVC |
|---|---|---|---|
| Grind | | | |
| Water | 50 | | |
| Foamstar A-34 Defoamer | 1.00 | | |
| Strodex TH-100 Surfactant | 2.47 | | |
| KOH (10%) | 2.00 | | |
| Tamol 165A Dispersant | 6.06 | 1.00 | |
| Kronos 4311 TiO$_2$ | 296 | | 19.73 |
| Minex 10 extender | 25 | | 3.31 |
| Attagel 50 clay | 3 | | 0.44 |
| Letdown | | | |
| Water | 10 | | |
| Binder | See Below | | |
| Foamstar A-34 defoamer | 2 | | |
| Add Grind Here | | | |
| Ultra E | 61.44 | | 10.52 |
| RM-5000 | See Below | | |
| RM-895$^a$ (Example 1) | See Below | | |
| Water$^a$ (Example 1) | See Below | | |

TABLE 5

Amounts of Water, Binder and Rheology Modifiers in Formulations

| Polymer | Water (g) | Binder Amt. (g) | RM-5000 (g) | RM-895 (g) |
|---|---|---|---|---|
| 1 | 40.00 | 476.56 | 42.6 | 11.12 |
| 2 | 31.54 | 489.95 | 42 | 7.96 |
| Comp. A | 68.00 | 429.28 | 30 | 10.54 |
| Comp. B | 126.36 | 437.08 | 30.20 | 4.12 |
| Comp. C | 58.14 | 430.14 | 42 | 4.56 |

The semi-gloss paint formulations were evaluated for tint strength (i.e., hiding power) by the following method, adapted from ASTM D 2745-89.

1. Each paint being compared was tinted at a level of 2.00 oz/gallon or other desired level with the desired colorant.
2. The container was vibrated by hand to make certain that the colorant settled into the paint.
3. The sample was placed on a mechanical shaker for 5 min.
4. Thick (3 mil Bird Film Applicator or greater) drawdowns of the tinted paints were made and allowed to dry under controlled conditions (75° F/50% RH) for 1 day.
5. The Y-reflectance (R) was measured in 3 areas of the paint drawdown and the average number reported.

Tint strength (TS) was calculated using the following equation:

$$TS=[(R_2)/(1-R_2)^2]\times[(1-R_1)^2/(R_1)]\times 100$$

where $R_1$ represents the standard, and $R_2$ represents the tested paint. In the present example, R1 was the reflectance of Comparative Example A, 63.46, which means that Comparative Example A was used as the "standard."

A difference of 0.5 in R (Delta R), and a difference of 2% tint strength are typically considered significant in the industry.

TABLE 6

Tint Strength of Coating Formulations

|  | Comp. A | Example 1 | Example 2 | Comp. B | Comp. C |
|---|---|---|---|---|---|
| % GMA-IDA | 0 | 2 | 4 | 0 | 0 |
| % PEM | 0 | 0 | 0 | 2 | 2 |
| Tint Strength |  |  |  |  |  |
| Y-Reflectance, R | 63.46 | 63.97 | 65.61 | 67.02 | 67.38 |
| % v. Comparative A | 100.00 | 103.68 | 116.72 | 129.64 | 133.23 |
| Delta R | 0 | 0.51 | 2.15 | 3.56 | 3.92 |

As illustrated in Table 6, tint strength improves as the level of GMA-IDA increases. These results show that the aminocarboxylic acid functionalized polymer binder (i.e, chelating polymer) results in increased tint strength compared to an MAA-functionalized polymer binder. Although the tint strength for Examples 1 and 2 is not as high as for Comparative Examples B and C which contain PEM, the tint strength clearly improves significantly as the level of chelating functionality in the polymer (i.e., GMA-IDA content) increases. Further increases in the amount of chelating functionality in the polymer binder are expected to show further improvements in the tint strength, up to and possibly surpassing that of PEM-containing polymer binders.

Evaluation of Paint Formulations for Freeze/Thaw Stability

The semi-gloss paint formulations were also evaluated for freeze-thaw behavior by the following freeze/thaw test method: Samples were prepared by filling half-pint metal containers 75% full with a particular sample formulation. The initial viscosity was measured in Krebs Units (KU) using a Brookfield KU-1 Viscometer. The containers were then sealed and placed into a 0° F. (-18° C.) freezer for 16 hours (h).

The containers were removed and allowed to thaw at ambient conditions for 8 h.

The aqueous coatings were hand-sheared and the appearance rated on a scale of 1-5, with a 5 indicating that the coating was smooth and creamy, a 3 indicating that the coating was usable but no longer smooth and creamy, and a 1 indicating that the coating had very high grit. Then the KU viscosity of the coating was measured and recorded. The results are shown below in Table 7. $KU_0$ refers to the initial viscosity in Krebs units.

TABLE 7

Effect of GMA-IDA on Freeze-Thaw Resistance

|  | Comp. A | Example 1 | Example 2 | Comp. B | Comp. C |
|---|---|---|---|---|---|
| % GMA-IDA | 0 | 2 | 4 | 0 | 0 |
| % PEM | 0 | 0 | 0 | 2 | 2 |
| Freeze/Thaw |  |  |  |  |  |
| Initial $KU_o$ | 91 | 96 | 98 | 98 | 112 |
| Cycle 1 KU | FAIL - SOLID | 135 | 125 | 131 | 114 |
| Delta KU | NA | 39 | 27 | 33 | 2 |
| Appearance | Solid | 2 | 3 | 2 | 3 |

The addition of GMA-IDA improved freeze/thaw resistance, as indicated by lower delta KU and appearance of the paint after one freeze/thaw cycle.

Evaluation of Paint Formulations for Viscosity Stability

The semi-gloss paint formulations were also evaluated for viscosity stability by the following method which analyzed changes in viscosity of the paint formulations while sitting overnight. Samples were prepared by filling half-pint metal containers 75% full with a particular sample formulation. The initial viscosity was measured in Krebs Units (KU) using a Brookfield KU-1 Viscometer. The containers were then sealed and left in a room at ambient temperature (20-25° C.) for 16 hours. The containers were opened and the paint formulations were each hand-sheared and their appearance rated on a scale of 1-5, with a 5 indicating that the coating was smooth and creamy, a 3 indicating that the coating was usable but no longer smooth and creamy, and a 1 indicating that the coating had very high grit. Then the overnight KU viscosity (KU O/N) of the paint was measured, again using the Brookfield KU-1 Viscometer, and recorded. The results are shown below in Table 8. $KU_o$ refers to the initial viscosity, and KU O/N refers to the overnight viscosity, in Krebs units.

"Delta KU" indicates the change in viscosity overnight and, since changes in viscosity of the paint formulations while simply sitting sealed and unused are undesirable, minimal values of Delta KU are preferred.

TABLE 8

Effect of GMA-IDA on Viscosity Stability

|  | Comp. A | Example 1 | Example 2 | Comp. B | Comp. C |
|---|---|---|---|---|---|
| % GMA-IDA | 0 | 2 | 4 | 0 | 0 |
| % PEM | 0 | 0 | 0 | 2 | 2 |
| Initial $KU_o$ | 91 | 93 | 93 | 96 | 97 |
| KU O/N | 90 | 94 | 97 | 97 | 110 |
| Delta KU | -1 | +1 | +4 | +1 | +13 |

The data presented in Table 8 indicates that use of chelating polymers having Aminocarboxylate functionality, as in the present invention, rather than polymers not containing PEM as binders in paint formulations provide viscosity stability comparable to that of paint formulations that have PEM-containing polymer binders prepared in a similar manner. In some instances, PEM-containing polymers exhibit poor viscosity stability as shown in Table 8. In other words, substituting chelating polymers according to the present invention in the place of phosphate-containing polymers in paint formulations does not negatively interfere with the viscosity stability of the paint.

What is claimed is:

1. An aqueous opaque coating formulation comprising:
   (A) an aqueous solvent;
   (B) an inorganic pigment; and
   (C) a chelating polymer which comprises polymerized units derived from:
      (1) one or more aminocarboxylic acid compounds or their salts;
      (2) one or more polymerizable monomers comprising a vinyl group, or an allyl group, or both, and optionally, an epoxy group; and
      (3) one or more ethylenically unsaturated monomers.

2. The aqueous opaque coating formulation of claim 1, wherein the inorganic material is selected from the group consisting of: titanium dioxide, zinc oxide, cobalt(II) stannate, cadmium selenide, cadmium sulfide, calcium copper silicate, hydrated chromium(III) oxide, talc, calcium carbonate, nepheline syenite, barium sulfate, hydrous kaolin, mullite, pyrophyllite, kyanite, sillimanite, attapulgite, mica, and combinations thereof.

3. The aqueous opaque coating formulation of claim 1, wherein the polymerized units derived from (C)(1) one or more aminocarboxylic acid compounds or their salts comprise those having aminocarboxylic groups of at least one of the following structures:

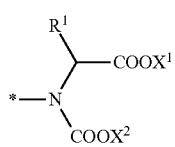

Structure I

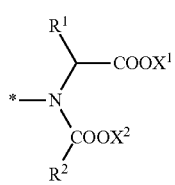

Structure II

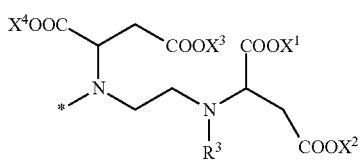

Structure III wherein $R^1$ and $R^2$ are each, independently, hydrogen, $COOX^3$ or $COOX^4$;

$X^1$, $X^2$, $X^3$ and $X^4$ are each, independently, hydrogen or a monovalent cation; $R^3$ is hydrogen or a unit derived from a polymerizable monomer; and

* is the location at which the aminocarboxylic group is bound to the chelating polymer at a unit derived from a polymerizable monomer, or at a unit derived from an ethylenically unsaturated monomer.

4. The aqueous opaque coating formulation of claim 1, wherein the (C)(1) one or more aminocarboxylic acid compounds or their salts are selected from the group consisting of: iminodiacetic acid, iminodisuccinic acid, ethylenediamine triacetic acid, ethylenediamine disuccinic acid, and their salts.

5. The aqueous opaque coating formulation of claim 1, wherein the units derived from (C)(2) one or more polymerizable monomers comprising a vinyl group, or an allyl group, or both, and, optionally, an epoxy group, have one or more of the following structures:

a) 

b) 

c) 

d) 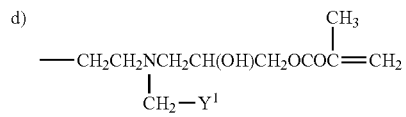

e) 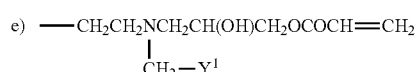

f) 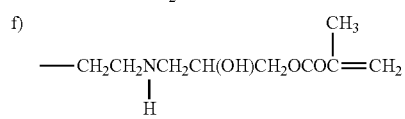

g) 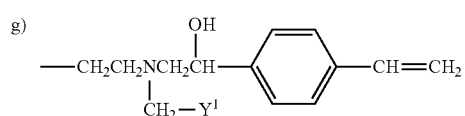

h) 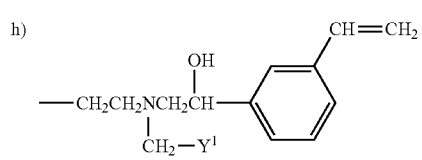

i) 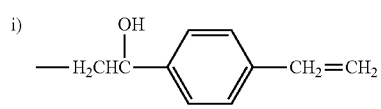

j) 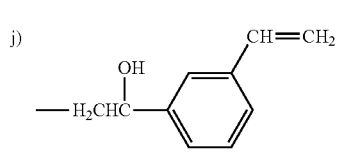

k) 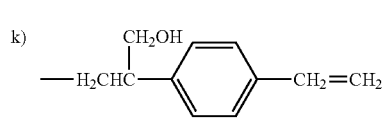

l) 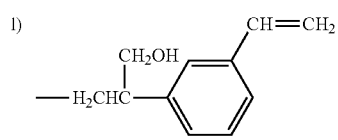

m) 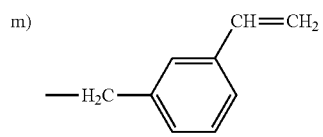

n) 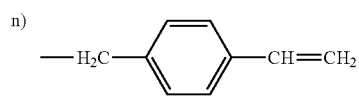

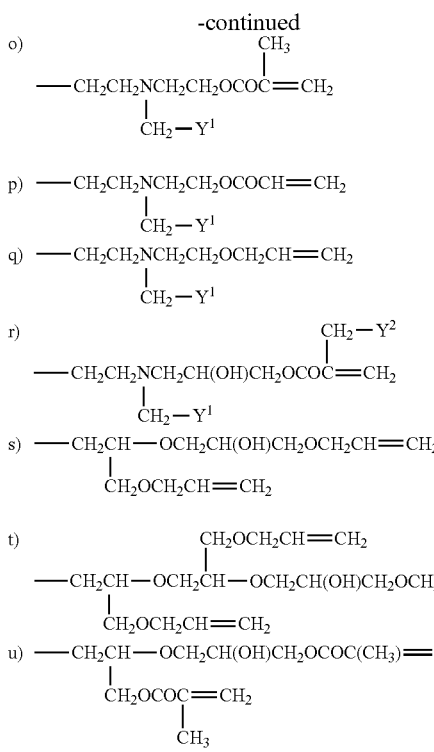

o) —CH₂CH₂NCH₂CH₂OCOC(CH₃)=CH₂
          |
          CH₂—Y¹ p) —CH₂CH₂NCH₂CH₂OCOCH=CH₂
          |
          CH₂—Y¹ q) —CH₂CH₂NCH₂CH₂OCH₂CH=CH₂
          |
          CH₂—Y¹ r) —CH₂CH₂NCH₂CH(OH)CH₂OCOC(CH₂—Y²)=CH₂
          |
          CH₂—Y¹ s) —CH₂CH—OCH₂CH(OH)CH₂OCH₂CH=CH₂
          |
          CH₂OCH₂CH=CH₂ t) —CH₂CH—OCH₂CH—OCH₂CH(OH)CH₂OCH₂CH=CH₂ (CH₂OCH₂CH=CH₂ branches)
          |
          CH₂OCH₂CH=CH₂ u) —CH₂CH—OCH₂CH(OH)CH₂OCOC(CH₃)=CH₂
          |
          CH₂OCOC(CH₃)=CH₂ wherein, Y¹ and Y² are each, independently and where present, hydrogen, COOX⁵ or COOX⁶, and X⁵ and X⁶ are each, independently, hydrogen or a monovalent cation, as defined hereinabove.

6. The aqueous opaque coating formulation of claim 5, wherein the (C)(2) one or more polymerizable monomers are selected from the group consisting of: glycidyl methacrylate, allyl glycidyl ether, vinylbenzyl chloride, allyl bromide, and their derivatives.

7. The aqueous opaque coating formulation of claim 1, wherein (C) the chelating polymer comprises polymerized units derived from: (3) the one or more ethylenically unsaturated monomers; and the reaction product of (1) the one or more aminocarboxylic acid compounds or their salts and (2) the one or more polymerizable monomers comprising a vinyl group, an allyl group, or both, and optionally, an epoxy group.

8. The aqueous opaque coating formulation of claim 1, wherein the one or more ethylenically unsaturated monomers from which the units (C)(3) of the chelating polymer are derived are selected from the group consisting of: carboxylic acids, esters of carboxylic acids, maleic acids, styrenes, sulfonic acids, and combinations thereof.

9. The aqueous opaque coating formulation of claim 1, comprising:
(A) from 1% to 94%, by weight, of the aqueous solvent,
(B) from 0.1% to 85%, by weight, of the inorganic pigment; and
(C) from 5% to 80%, by weight, of the chelating polymer, based on the total weight of the aqueous opaque coating formulation.

10. A method for providing an opaque film for covering a substrate having a surface which comprises applying the aqueous opaque coating formulation of claim 1 to the surface of the substrate.

11. The method of claim 10, wherein the polymerized units derived from (C)(1) one or more aminocarboxylic acid compounds or their salts comprise those having aminocarboxylic groups of at least one of the following structures:

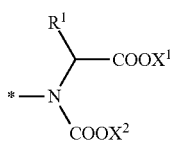

Structure I

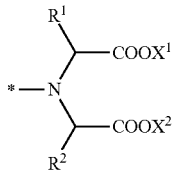

Structure II

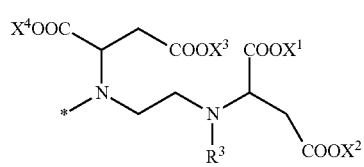

Structure III wherein R¹ and R² are each, independently, hydrogen, COOX³ or COOX⁴;

X¹, X², X³ and X⁴ are each, independently, hydrogen or a monovalent cation; R³ is hydrogen or a unit derived from a polymerizable monomer; and

* is the location at which the aminocarboxylic group is bound to the chelating polymer at a unit derived from a polymerizable monomer, or at a unit derived from an ethylenically unsaturated monomer.

* * * * *